May 21, 1946.  E. C. WARRICK ET AL  2,400,615
THERMOSTATIC SURGE VALVE
Filed Jan. 10, 1944
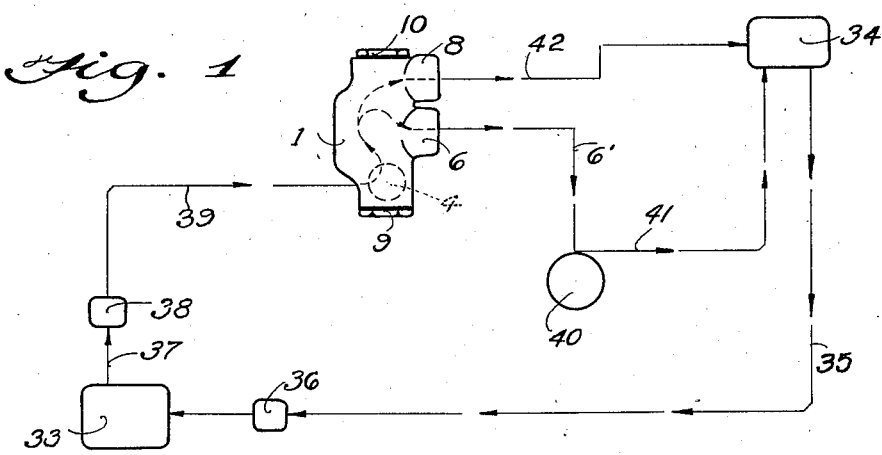
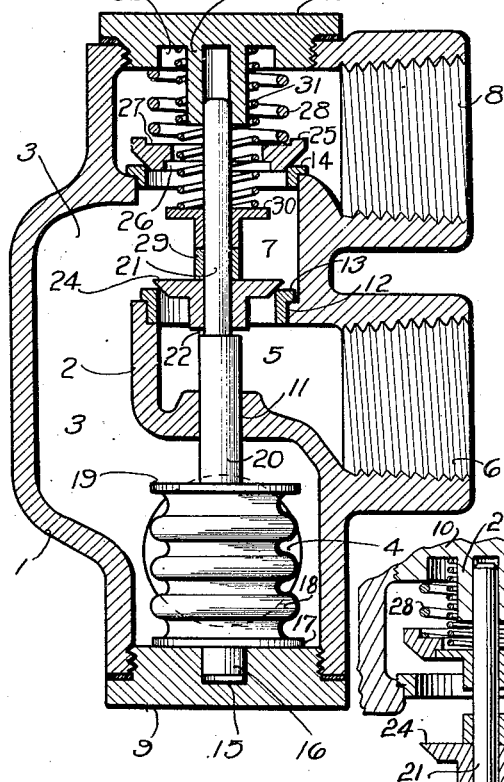
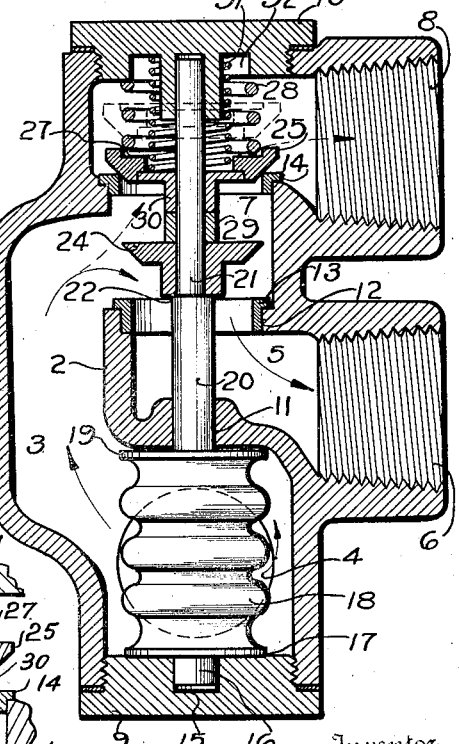
Inventor
Harold Cruzan,
Edward C. Warrick,
By C. B. Stevens
Attorney Patented May 21, 1946

2,400,615

UNITED STATES PATENT OFFICE 2,400,615

THERMOSTATIC SURGE VALVE

Edward C. Warrick, Cincinnati, Ohio, and Harold Cruzan, Los Angeles, Calif., assignors to United Aircraft Products, Inc., Dayton, Ohio, a corporation of Ohio Application January 10, 1944, Serial No. 517,721

5 Claims. (Cl. 236—34)

This invention relates to a thermostatic by-pass control valve and pertains more particularly to a device for controlling the surge pressure in a fluid circulatory system, wherein a lubricant is circulated under pressure through a heat exchanger or temperature and viscosity conditioning unit by a pump or analogous pressure producing means.

While the thermostatic by-pass control valve forming the subject matter of the present invention is hereinafter shown and described as being applied to a lubricant circulating and conditioning system of an aircraft engine, it is to be particularly noted that same is not restricted to such specific use, but is applicable to power units used in connection with all other types of motor vehicles or with any and all types of fluid circulatory systems wherein a similar problem is involved.

At the present time, the lubricant circulating and conditioning systems as used in aircraft engines, generally include a pressure or scavenge pump disposed in the conduit leading from the engine back to the reservoir. In order that the heat exchange unit may function to properly control the temperature and thereby the viscosity of the oil being returned to the reservoir, the same is installed in the return conduit between the scavenge pump and reservoir. Ordinarily, during the initial starting of the engine, for the purpose of conditioning the same preparatory to flight, and particularly during low temperature conditions, the lubricant in the various conduits, heat exchange unit and other parts of the system is more viscous than desired for efficient operation. Under such circumstances, high pressure is required to force the lubricant through the various conduits, the heat exchange unit, and to the vital parts of the engine which require uniform and constant lubrication. From the foregoing it will be appreciated that an almost instantaneous high pressure will be built up immediately upon starting the engine and scavenge pump, which action results in serious damage to the system and heat exchange unit by bulging or collapsing the shell and/or tubes of the latter.

It is therefore the primary important object of this invention to provide a device of the above character which will entirely eliminate the possibility of excessive or surge pressure, generated by the scavenge pump, being exerted on the heat exchange unit so as to protect the latter from damage which may result from such excessive or surge pressure.

Another important object of this invention is to provide a thermostatic control or by-pass valve of the above character which is entirely automatic in operation and one which will prevent damage to the lubricating system resulting from excessive pressure built up by the scavenge pump under actual flight conditions, for example, in situations where the motor and lubricating system is temporarily cut out or is unoperative, during power dives at high altitudes and then restored immediately to high speed. These conditions usually result in rapidly incerasing the viscosity of the lubricant and in most instances congealing the latter.

Another important object of this invention is to provide a thermostatic fluid control valve of the above character by which the lubricant flow through or around the heat exchange unit is controlled by thermal changes therein and which will automatically function to protect the heat exchange unit in the event of any obstruction occurring in the circulatory system whether due to the congealed condition of the lubricant or from any other cause.

Another important object of this invention is to provide a control valve of the above character which will automatically function to by-pass the lubricant around the heat exchange unit directly to the reservoir in the event the viscosity of the lubricant is such that same will not readily flow around the coolant passages under pressure normally generated by the scavenger pump.

Another important object of this invention is to provide a control valve of the above character which will automatically function to by-pass the lubricant around the heat exchange unit and to the reservoir in the event that the flow path is obstructed.

A still further important object of this invention is to provide a by-pass control valve which is of simple construction, easily installed, efficient in operation, and one which may be readily manufactured and placed upon the market at a reasonable cost.

The foregoing and other important objects and advantages will be readily apparent throughout the course of the following detailed description and drawing wherein like reference characters indicate like parts, and in which:

Figure 1 is a diagrammatic plan of a lubricant circulatory system with the thermostatic by-pass control valve forming the subject matter of this invention, shown in vertical section, the latter also being shown in conjunction with a heat exchange unit, the latter being of the general type disclosed in the patent to R. G. Dykeman, et al., No. 1,864,052, issued June 21, 1932, or of the jacketless type shown in our co-pending application Ser. No. 455,820.

Figure 2 is a vertical section of the thermostatic by-pass control valve with the conduit leading to the heat exchange unit closed and with the by-pass conduit open, Figure 3 is a vertical section through the control valve, similar to Figure 2, with the conduit leading to the heat exchange unit open and with the by-pass conduit closed, the valve controlling the by-pass conduit being further shown in dotted line position to indicate the movement thereof in the event that sudden surge pressure occurs in the system, and Fig. 4 is a fragmentary view of the control unit, showing the valves as they appear under conditions of surge pressure.

Referring in detail to the drawing, 1 designates a hollow body, formed with an internal partition, 2 dividing the same so as to provide a main passage 3 leading from an inlet 4, shown in dotted lines by way of a branch passage 5 to a main outlet 6 and by way of a branch passage 7 to a by-pass outlet 8.

The lower portion of the body 1 is provided with a screw threaded opening closed by a plug 9, while the upper portion of the body is provided with a screw-threaded opening closed by a cap 10, the dual functions or purposes of which will be hereinafter more fully described.

The partition 2 is provided with a guide opening 11 in the lower wall thereof and with a vertically alined opening 12 in its upper wall in which is secured a valve seat 13. Disposed within the branch passage 7 leading to the by-pass outlet 8 and alined vertically with the first mentioned valve seat 13 is a second valve seat 14.

The plug 9, is provided with a centrally located recess 15 vertically alined with respect to the guide opening 11 and is formed to receive a depending lug or stem 16 carried by a plate 17 which latter forms the lower or bottom end of a bellows type thermostat 18. However, at this point it is to be understood that a thermostat of any other design or type may be utilized.

The upper end of the thermostat 18 is formed by a plate 19 having integrally connected thereto, a stem or rod 20. Extending upwardly through the guide opening 11 and valve seats 13 and 14. The stem or rod 20 is further formed with a reduced upper portion 21 to provide a shoulder 22 intermediate the upper and lower ends thereof. The cap 10 is provided with a centrally located depending sleeve 23 or a length to slidably receive and guide the upper end of the stem or rod 20.

Slidably mounted upon the stem 20 adjacent to and adapted to be engaged by the shoulder 22 during a portion of the movement of said stem, is a valve 24 for opening and closing the branch passage 5.

Disposed about the reduced upper end of the stem 20 and adapted for engagement with the valve seat 14, is an annular or ring valve 25 having its lower face provided with a valve seat 26. The upper face of the ring valve 25 is further formed with a recess 27 to receive the lower end of a compression spring 28 of predetermined value which has its upper end bearing against a portion of the lower face of cap 10, whereby to hold the ring valve 25 in engagement with seat 14 during certain phases of operation of the mechanism.

Also slidably mounted upon the reduced upper portion 21 of stem 20, above the valve 24 and separated from the latter by a sliding collar or shim 29, is a plate-like valve 30 for engaging the valve seat 26 to close the opening through the ring valve 25. The valve 30 is normally biased toward open position and toward the valve 24 by means of a compression spring 31 which has extending through the ring valve 25 and its lower end engaging the upper face of the valve 30, and its upper end seated within an annular recess 32 formed in the lower face of the cap 10. At this point it is to be particularly noted that the predetermined value of the compression spring 31 is less than that of the spring 28, for a purpose to be hereinafter more carefully described.

Referring to the diagrammatic disclosure of Figure 1 of the drawing, the thermostatic surge valve 1 forming the subject matter of the present invention is disposed within a lubricant circulatory and conditioning system, as used more particularly in aircraft, and includes an internal combustion engine or other suitable power plant 33, to which a lubricant reservoir 34 or other source of supply is connected by means of a conduit 35 and in which latter is installed a pump 36 for withdrawing lubricant from the reservoir and forcing the same into the engine. Connected to the engine by means of a conduit 37 is a scavenger pump 38 for withdrawing lubricant from the engine and forcing the same by way of conduit 39 through the inlet 4 of the thermostatic surge valve 1.

The lubricant, dependent upon its viscosity and consequently its temperature, is then forced to the reservoir by way of branch passage 5, through main outlet 6, heat exchanger unit 40, and conduit 41 during one phase in the operation and/or through by-pass outlet 8 and conduit 42 to the reservoir 34 in another phase of the operation thereof.

In the operation of the thermostatic surge valve, assuming that the lubricant in the heat exchanger unit 40 and the circulatory system is congealed or in a highly viscous condition, the parts of the surge valve are in the position shown in Figure 2. Lubricant is forced into the engine 33 from the reservoir 34 by means of the pressure pump 36. In its passage through the engine the lubricant is heated and from whence it is then withdrawn by the scavenger pump 38 and forced through inlet 4 of the surge valve body 1. The lubricant as it enters inlet 4 will flow around thermostat 18 and in so doing transfers a portion of its heat to the latter. Initially under the foregoing conditions, the lubricant wil flow through main passage 3, branch passage 7, through open ring valve 25, by-pass outlet 8, conduit 42 and thence back to reservoir 34 from where it is again withdrawn and recirculated through the engine and system in the cycling operation just described.

Since the lubricant is usually highly viscous when initially placing the engine in operation from a cold start, it is obvious that a high pressure is required to blow or clear out the by-pass conduit 42. This resultant high pressure if permitted to come into contact with the heat exchanger unit 40 would burst the unit and/or the tubes of which the unit is composed, at least in part, and thereby cause failure of the entire lubricating system.

In order to overcome and entirely eliminate the possibility of damage to the heat exchange unit under the foregoing conditions, the valve 24 is placed over the heat exchanger inlet passages 5 and 6 in the manner illustrated so that the passages 5 and 6 will always be closed off when the lubricant is below a predetermined temperature.

As the lubricant flowing through the surge valve from the inlet 4 to the by-pass outlet 8 increases in temperature as a result of increased engine temperature, the thermostat 18 is caused to expand, expansion of the thermostatic element 18 causes upward movement of the stem 20 until the shoulder 22 contacts the lower portion of the valve 24 whereupon continued expansion of the thermostat and thereby continued upward movement of the stem will unseat valve 24 and seat valve 30 so as to close the opening through the ring valve 25. This action and consequent positioning of the several parts of the device will permit the lubricant to then, flow to the heat exchange unit 40, from whence it then passes through a by-pass of the latter around the core, if the latter is congealed, or through the core, conduit 41 and then to the reservoir.

In the event the lubricant in the core of the heat exchanger unit or in the by-pass around the latter is congealed or otherwise presents a restriction or stoppage of the flow, ring valve 25 and valve 30, which in the meantime have together become a single relief valve, will move upwardly as a unit against the springs 28 and 31 to open the passage leading to the by-pass outlet 8, thereby permitting only a predetermined maximum of pressure to be applied to the heat exchanger unit for warm-up purposes.

As the heat exchanger unit heats up to a point where the lubricant can flow therethrough due to its decreased viscosity, the ring valve 25 will be reseated under the influence of spring 28, and together with valve 30 will again close passages 7 and 8 to the by-pass flow of the lubricant.

In the event the engine is idling or is completely cut out as for example in gliding during bombing operations, and the lubricant in the heat exchanger unit and/or core thereof is suddenly congealed the relief mechanism which includes the ring valve 25 and valve 30 together will open as shown in dotted lines Figure 3 and in full lines in Figure 4, to by-pass the lubricant should a sudden surge occur due to restarting or acceleration of the engine.

Further in the event the engine is stopped and the system becomes cold due to low atmospheric conditions, the thermostat 18 will contract and allow the spring 31 to reset the mechanism to the position shown in Figure 2.

It will be seen from the foregoing that the heat exchanger unit 40 will be protected at all times regardless of atmospheric conditions or changes and that the lubricant can only flow through the main outlet 6 to the heat exchanger unit when the same has attained a predetermined degree of viscosity and temperature.

It is to be understood that the form of the invention herein shown and described is to be taken as a preferred example, of the invention and that various changes in the shape, size and arrangement of parts may be resorted to without departing from the spirit of the invention or from the scope of the sub-joined claims.

We claim:

1. A control valve for use in a system circulating fluid of variable pressure, comprising a housing formed with a fluid inlet and a pair of fluid outlets, first and second aligned ports communicating the respective outlets with said inlet, a first valve reciprocable to open and close said first port, a second valve adapted to seat in a closed position on said second port and having a central opening permitting the flow of fluid therethrough, a third valve between said first and second valves and movable in accompaniment with opening movement of said first valve to a position closing the central opening in said second valve, means urging said first valve closed whereby the flow of fluid through the housing is from the inlet through said second port by way of the central opening in said second valve, regulating apparatus for opening said first valve whereby the flow of fluid through said second port is cut off and established through said first port, and means holding said second valve closed and adapted to yield under a predetermined fluid pressure to open said second port irrespective of the position of said first valve.

2. A surge valve for the protection of devices in a system circulating a congealable liquid under pressure and under conditions of changing temperature, said valve being disposed in the system in advance of the device to be protected and comprising a body formed with an inlet and main and by-pass outlets; internal ribs in said body defining first and second aligned ports leading respectively to said main and by-pass outlets; a main outlet valve movable in the direction of liquid flow to close said first port; an annular valve movable in a direction opposed to the liquid flow to seat in said second port; an auxiliary valve movable in the direction of liquid flow to close the center area of said annular valve and thereby close said second port; a spring pressing said annular valve to seated position; another spring pressing said auxiliary valve to open position and said main outlet valve to closed position; a guide and actuating rod extending longitudinally through said several valves and adapted when moved axially in one direction to lift said main outlet valve to open position and to move said auxiliary valve to a position closing the center area of said annular valve; and a thermostat responsive to a rising temperature of the liquid at said inlet to move said rod in said one direction.

3. A surge valve according to claim 2, characterized in that said auxiliary valve is movable independently of said main outlet valve, whereby the assembly comprising said annular valve and said auxiliary valve may move to open said by-pass outlet in the event of excessive pressure in said body irrespective of the position of said main outlet valve and thermostat.

4. A device for controlling the distribution of fluid in a system flowing fluid under pressure and under conditions of changing temperature, comprising a hollow body having an inlet and main and by-pass outlets; a main valve controlling flow from said main outlet; a valve assembly comprising an annular ring and a masking disc therefor controlling flow from said by-pass outlet; yielding means pressing said annular ring and said main valve to closed position and pressing said masking disc to open position; and a thermostat responsive to a rising temperature of the fluid at said inlet for opening said main valve and for moving said masking disc to a position closing the opening in said annular ring, said valve assembly being movable under a predetermined fluid pressure in said body to a position opening said by-pass outlet irrespective of the position of said main valve and of said thermostat.

5. A device for controlling the distribution of fluid in a system flowing fluid under pressure and under conditions of changing temperature, comprising a hollow body having an inlet and main and by-pass outlets; internal ribs in said body defining first and second aligned ports leading respectively to said main and by-pass outlets; a guide and actuating rod extending longitudinally through said aligned ports; first, second, and third valves surrounding said guide rod in longitudinally spaced positions, said first valve being arranged to close said first port and said second and third valves cooperating to close said second port; means tending to hold said first valve closed and to hold said second and third valves out of cooperative relation, whereby flow may take place through said by-pass outlet; means responsive to axial movement of said rod in one direction for opening said first valve and for moving said second and third valves toward cooperative relation, whereby to divert the flow from said by-pass outlet to said main outlet; and a thermostat responsive to a rising temperature of the fluid at said inlet for moving said guide and actuating rod in said one direction.

EDWARD C. WARRICK.
HAROLD CRUZAN.